United States Patent
Nagano et al.

(10) Patent No.: US 11,945,960 B2
(45) Date of Patent: *Apr. 2, 2024

(54) AQUEOUS INK FOR INKJET RECORDING

(71) Applicant: KAO CORPORATION, Tokyo (JP)

(72) Inventors: Tomohiko Nagano, Izumiotsu (JP); Teruyuki Fukuda, Wakayama (JP); Takahiro Maeda, Wakayama (JP)

(73) Assignee: KAO CORPORATION, Tokyo (JP)

( * ) Notice: Subject to any disclaimer, the term of this patent is extended or adjusted under 35 U.S.C. 154(b) by 313 days.

This patent is subject to a terminal disclaimer.

(21) Appl. No.: 17/266,389

(22) PCT Filed: Jul. 26, 2019

(86) PCT No.: PCT/JP2019/029385
§ 371 (c)(1),
(2) Date: Feb. 5, 2021

(87) PCT Pub. No.: WO2020/031745
PCT Pub. Date: Feb. 13, 2020

(65) Prior Publication Data
US 2021/0317325 A1    Oct. 14, 2021

(30) Foreign Application Priority Data
Aug. 9, 2018    (JP) ................................ 2018-150694

(51) Int. Cl.
*C09D 11/328* (2014.01)
*B41J 2/21* (2006.01)
(Continued)

(52) U.S. Cl.
CPC ........... *C09D 11/328* (2013.01); *B41J 2/2107* (2013.01); *B41M 5/0023* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107;
(Continued)

(56) References Cited

U.S. PATENT DOCUMENTS 7,008,994 B1    3/2006 Waki
2004/0039081 A1*    2/2004 Kawaguchi .......... C09D 11/324
523/160
(Continued)

FOREIGN PATENT DOCUMENTS

CN    103003328 A    3/2013
CN    107922776 A    4/2018
(Continued)

OTHER PUBLICATIONS

International Search Report, dated Oct. 8, 2019, for International Application No. PCT/JP2019/029387, with an English translation.
International Search Report, dated Sep. 24, 2019, for International Application No. PCT/JP2019/029386, with an English translation.
U.S. Appl. No. 17/266,229, filed Feb. 5, 2021.
U.S. Appl. No. 17/266,346, filed Feb. 5, 2021.
Qiang Taotao, "Synthetic Leather Chemicals," retrieved from the Internet, URL: http://www.wcnhuakxjyty.cn/n/print.jsp, Jul. 30, 2016, 4 pages total.
Extended European Search Report for European Application No. 19848012.1, dated Mar. 30, 2022.
(Continued)

*Primary Examiner* — Manish S Shah
(74) *Attorney, Agent, or Firm* — Birch, Stewart, Kolasch & Birch, LLP

(57) ABSTRACT

The present invention relates to [1] an aqueous composition for ink-jet printing, containing a carbodiimide compound, a polyester resin and water; [2] a ink set for ink-jet printing containing an aqueous composition a containing a carbodiimide compound and water, and an aqueous composition b containing a polyester resin; [3] an ink set for ink-jet printing, containing the aforementioned aqueous composition for ink-jet printing and a water-based ink containing a colorant; and [4] an ink-jet printing method including the step 1 of ejecting a carbodiimide compound, a polyester resin, a colorant and water onto a surface of a printing medium by an ink-jetting method to print characters or images thereon; and the step 2 of subjecting the resulting printed characters or images to heat treatment at a temperature of 50 to 200° C. According to the aqueous composition of the present invention, it is possible to obtain a printed material that is excellent in rub fatness.

11 Claims, No Drawings

(51) Int. Cl.
*B41M 5/00* (2006.01)
*B41M 7/00* (2006.01)
*C09D 11/104* (2014.01)
*C09D 11/38* (2014.01)
*C09D 11/40* (2014.01)
*C09D 11/54* (2014.01)

(52) U.S. Cl.
CPC ............ *C09D 11/104* (2013.01); *C09D 11/38* (2013.01); *C09D 11/40* (2013.01); *C09D 11/54* (2013.01); *B41M 7/009* (2013.01)

(58) Field of Classification Search
CPC ..... C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | | |
|---|---|---|---|---|
| 2004/0242726 | A1* | 12/2004 | Waki | C09D 11/322 523/160 |
| 2006/0098066 | A1* | 5/2006 | Bauer | C09D 11/40 347/100 |
| 2006/0293410 | A1* | 12/2006 | Tokita | C09D 11/30 106/31.27 |
| 2008/0108746 | A1* | 5/2008 | Waki | C09D 11/322 524/590 |
| 2009/0226679 | A1 | 9/2009 | Yatake et al. | |
| 2009/0226682 | A1 | 9/2009 | Yatake | |
| 2011/0032304 | A1 | 2/2011 | Mozel et al. | |
| 2012/0046378 | A1 | 2/2012 | Sloan | |
| 2012/0276028 | A1 | 11/2012 | Kojima et al. | |
| 2013/0106945 | A1* | 5/2013 | Ikeda | B41J 2/2107 347/20 |
| 2013/0122310 | A1 | 5/2013 | Tielemans et al. | |
| 2013/0177719 | A1 | 7/2013 | Tasaka et al. | |
| 2013/0260114 | A1 | 10/2013 | Saitou et al. | |
| 2014/0139595 | A1 | 5/2014 | Hong et al. | |
| 2018/0118965 | A1 | 5/2018 | Tabuchi et al. | |
| 2018/0142110 | A1 | 5/2018 | Maeda | |
| 2018/0223119 | A1 | 8/2018 | Oriakhi et al. | |
| 2018/0258200 | A1 | 9/2018 | Matsumoto | |
| 2019/0382606 | A1 | 12/2019 | Iraqi et al. | |
| 2020/0039245 | A1 | 2/2020 | Akima et al. | |
| 2020/0332137 | A1 | 10/2020 | Kawata et al. | |
| 2021/0163765 | A1 | 6/2021 | Ozaki et al. | |

FOREIGN PATENT DOCUMENTS

| | | |
|---|---|---|
| EP | 1 086 975 A1 | 3/2001 |
| JP | 2000-7963 A | 1/2000 |
| JP | 2001-279151 A | 10/2001 |
| JP | 2002-121447 A | 4/2002 |
| JP | 2002-294133 A | 10/2002 |
| JP | 2005-225932 A | 8/2005 |
| JP | 2007-514809 A | 6/2007 |
| JP | 2011-121867 A | 6/2011 |
| JP | 2014-144578 A | 8/2014 |
| JP | 2015-63064 A | 4/2015 |
| JP | 2015-193788 A | 11/2015 |
| JP | 2016-505651 A | 2/2016 |
| JP | 2016-64574 A | 4/2016 |
| JP | 2017-101170 A | 6/2017 |
| JP | 2017-119799 A | 7/2017 |
| JP | 2017-165025 A | 9/2017 |
| JP | 2017-190369 A | 10/2017 |
| JP | 2018-70827 A | 5/2018 |
| JP | 2018-80255 A | 5/2018 |
| WO | WO 03/097753 A1 | 11/2003 |
| WO | WO 2006/064193 A1 | 6/2006 |
| WO | WO 2011/051711 A1 | 5/2011 |
| WO | WO 2012/042665 A1 | 4/2012 |
| WO | WO 2017/009601 A1 | 1/2017 |
| WO | WO 2018/138720 A1 | 8/2018 |

OTHER PUBLICATIONS

Extended European Search Report for European Application No. 19846670.8, dated Apr. 8, 2022.
Partial Supplementary European Search Report for European Application No. 19848427.1, dated Apr. 12, 2022.
Extended European Search Report for European Application No. 19848427.1, dated Jul. 22, 2022.
International Search Report for PCT/JP2019/029385 dated Sep. 24, 2019.

* cited by examiner

AQUEOUS INK FOR INKJET RECORDING

FIELD OF THE INVENTION

The present invention relates to an aqueous composition for ink-jet printing, an ink set for ink-jet printing, and an ink-jet printing method.

BACKGROUND OF THE INVENTION

From the viewpoint of improving water resistance and weathering resistance of a printed material, there has been proposed an ink using not a dye but a pigment as a colorant. However, when printing characters or images on a low-ink absorbing printing medium such as a coated paper or a resin film, etc., using such a pigment ink, pigment particles tend to remain on a surface of the printing medium after the printing. For this reason, there tends to occur such a problem that when any stimulus is applied to a surface of the printed material, the pigment particles are likely to be peeled off from the printing medium. To solve the problem, ultraviolet-curable inks (UV inks) have been proposed.

In ordinary UV inks, a pigment is dispersed in a monomer, and after printing characters or images using the inks, the monomer component contained in the inks is polymerized by irradiation of ultraviolet rays thereto, whereby it is possible to obtain a printed material having high image fastness. However, the UV inks have posed various problems such as poor working environments owing to peculiar odor of the monomer used or less safety owing to migration of the monomer or a polymerization initiator exuded from the printed material.

In consequence, in order to improve image fastness of the printed material obtained using a water-based pigment ink having high safety, there has been developed a water-based pigment ink containing a carbodiimide, or an aqueous composition such as a coating solution, etc., which can be used in combination with the ink.

For example, JP 2007-514809A (Patent Literature 1) aims at enhancing durability of images printed on a plain paper or a fabric or cloth, and discloses an ink-jet ink containing a vehicle and a carbodiimide groups-containing component dispersed and/or dissolved in the vehicle, in which the ink further contains an aqueous vehicle as the vehicle and a colorant dispersed in the aqueous vehicle with a polymer dispersant. In addition, in Examples of the Patent Literature 1, there are also described a block copolymer and a graft copolymer which contain methacrylic acid as the dispersant.

JP 2016-505651A (Patent Literature 2) aims at prolonging a shelf life of a self-crosslinking pigment ink, and discloses a dispersion containing a pigment, a polymer containing a carboxyl group, a crosslinking agent capable of undergoing a crosslinking reaction with the carboxyl group, an inhibition agent containing a tertiary amine and a liquid carrier, and an ink containing the dispersion. In the Patent Literature 2, as the polymer containing a carboxyl group, there are described a styrene-acrylic copolymer, a styrene-methacrylic acid copolymer, a maleic resin, a maleic anhydride-modified polymer, a carboxylated polyurethane, a carboxylated styrene-butadiene block copolymer, a carboxylated styrene-butadiene-styrene block copolymer, a carboxylated styrene-isoprene-styrene block copolymer and a carboxylated polyolefin, and as the crosslinking agent, there are described a water-dispersible polymer containing a carbodiimide group, etc.

SUMMARY OF THE INVENTION

The present invention relates to an aqueous composition for ink-jet printing which contains a carbodiimide compound, a polyester resin and water.

DETAILED DESCRIPTION OF THE INVENTION

In the technologies described in the aforementioned Patent Literatures 1 and 2, when conducting the printing on a non-water absorbing printing medium such as a resin film, etc., the resulting printed material tends to be insufficient in rub fastness.

Meanwhile, the ink-jet printing method is more suitable for production of a small number but many kinds of printed materials than analog printing methods such as a gravure printing method, etc., and therefore it has been demanded to apply the ink-jet printing method to a still wider range of printing media. With the increase in kinds of printing media to which the ink-jet printing method is applied, in the commercial or industrial printing application fields using printing media such as a coated paper or a resin film, it has been required that the resulting printed material is further improved, in particular, in rub fastness.

In addition, as a packaging substrate for containers used, for example, in food or medical application fields, such as a PET bottle and a plastic case, etc., there have been widely used heat-shrinkable resin films. Such a packaging substrate can be used for printing not only package designs, but also important information including product information such as statements of efficacy, usage, best-before date, lot number, etc., thereon. For this reason, it has also been required that even those printed materials using the heat-shrinkable resin films are improved in rub fastness.

The present invention relates to an aqueous composition for ink-jet printing which is capable of providing a printed material that is excellent in rub fastness, an ink set for ink-jet printing and an ink-jet printing method.

The present inventors have found that an aqueous composition containing a carbodiimide compound, a polyester resin and water is capable of improving rub fastness of a printed material obtained by inkjet printing.

That is, the present invention relates to the following aspects [1] to [4].

[1] An aqueous composition for ink-jet printing containing a carbodiimide compound, a polyester resin and water.

[2] An ink set for ink-jet printing containing an aqueous composition a containing a carbodiimide compound and water, and an aqueous composition b containing a polyester resin and water.

[3] An ink set for ink-jet printing, containing the aqueous composition for ink-jet printing according to the above aspect [1], and a water-based ink containing a colorant.

[4] An ink-jet printing method including the following steps 1 and 2;

Step 1; ejecting a carbodiimide compound, a polyester resin, a colorant and water onto a surface of a printing medium by an ink-jetting method to print characters or images thereon; and Step 2; subjecting the characters or images printed in the step 1 to heat treatment at a temperature of not lower than 50° C. and not higher than 200° C.

In accordance with the present invention, it is possible to provide an aqueous composition for ink-jet printing which is capable of providing a printed material that is excellent in rub fastness, an ink set for ink-jet printing, and an ink-jet printing method.

[Aqueous Composition for Ink-Jet Printing]

The first embodiment of the aqueous composition for ink-jet printing according to the present invention (hereinafter also referred to merely as an "aqueous composition") is an aqueous composition containing a carbodiimide compound, a polyester resin and water.

In addition, the second embodiment of the aqueous composition for ink-jet printing according to the present invention is a combination of an aqueous composition a containing a carbodiimide compound and water, and an aqueous composition b containing a polyester resin and water.

In the first embodiment of the present invention, by mixing the aqueous composition and the water-based ink containing the colorant on a surface of a printing medium or by further incorporating the colorant into the aqueous composition, it is possible to improve rub fastness of the resulting printed material.

In the second embodiment of the present invention, the colorant can be incorporated into at least one of the aqueous composition a and the aqueous composition b, and by mixing the aqueous composition a and the aqueous composition b on the surface of the printing medium, it is possible to improve rub fastness of the resulting printed material.

Meanwhile, the term "printing" as used in the present specification means a concept that includes printing or typing operation for printing characters or images, and the term "printed material" as used in the present specification means a concept that includes printed matters or typed materials on which characters or images are printed.

In addition, the term "aqueous" as used in the present specification means that water has a largest content among components of a medium contained in the aqueous composition.

The aqueous composition of the present invention is capable of providing a printed material that is excellent in rub fastness. The reason why the aforementioned advantageous effect can be attained by the present invention is considered as follows though it is not clearly determined yet.

That is, in general, upon conducting the ink-jet printing, after the ink is impacted onto a surface of a non-water absorbing printing medium such as a resin film, the colorant particles contained in the ink tend to remain adhered onto the surface of the printing medium without penetrating into the printing medium. In the present invention, it is considered that the aqueous composition is brought into contact with the ink, and the carbodiimide compound and the polyester resin contained in the aqueous composition are subjected to crosslinking reaction with each other, so that a coating film of the ink having a firm crosslinked structure is formed on the printing medium. In addition, it is considered that by using the polyester resin in the aqueous composition, the ink is enhanced in adhesion properties to the printing medium, and it is further possible to form a coating film of the ink which tends to hardly suffer from swelling with an alcohol, etc. Thus, it is considered that the colorant particles are fixed on the printing medium by the thus formed coating film of the ink, so that the resulting printed material can be improved in rub fastness.

<Carbodiimide Compound>

In the aqueous composition of the present invention, by using the carbodiimide compound in combination with the polyester resin, it is possible to form a firm coating film of the ink on the printing medium while maintaining storage stability of the aqueous composition, so that the resulting printed material can be improved in rub fastness.

The carbodiimide compound is preferably a polycarbodiimide compound containing two or more carbodiimide groups in a molecule thereof. The polycarbodiimide compound is preferably a polymer containing carbodiimide groups (hereinafter also referred to merely as a "carbodiimide group-containing polymer").

The carbodiimide group equivalent of the carbodiimide group-containing polymer is preferably not less than 200, more preferably not less than 250 and even more preferably not less than 300 from the viewpoint of improving rub fastness of the resulting printed material, and is also preferably not more than 650, more preferably not more than 500, even more preferably not more than 400 and further even more preferably not more than 360 from the viewpoint of improving storage stability of the aqueous composition.

Incidentally, the carbodiimide group equivalent of the carbodiimide group-containing polymer as used herein means a mass of the carbodiimide group-containing polymer per 1 mol of the carbodiimide group.

The polycarbodiimide compound is preferably an aqueous polycarbodiimide compound from the viewpoint of improving reactivity, stability and handling properties thereof. The aqueous polycarbodiimide compound may be either water-soluble or water-dispersible. Examples of the aqueous polycarbodiimide compound include compounds containing a hydrophilic group at a terminal end thereof.

Such an aqueous polycarbodiimide compound may be produced by subjecting an organic diisocyanate compound to condensation reaction in association with decarboxylation (removal of carbon dioxide) to form an isocyanate-terminated polycarbodiimide, and then further adding a known hydrophilic segment containing a functional group having a reactivity with the isocyanate group.

Examples of commercially available products of the carbodiimide group-containing polymer include "CARBODILITE E-02", "CARBODILITE E-03A", "CARBODILITE E-05", "CARBODILITE V-02", "CARBODILITE V-02-L2" and "CARBODILITE V-04" (tradenames) all available from Nisshinbo Chemical Inc., and the like <Polyester Resin>

The aqueous composition of the present invention contains the polyester resin from the viewpoint of improving rub fastness of the resulting printed material. It is considered that the polyester resin is allowed to undergo a crosslinking reaction with the carbodiimide compound to thereby form a firm coating film of the ink, so that the resulting printed material can be improved in rub fastness.

The polyester resin contains a constitutional unit derived from an alcohol component and a constitutional unit derived from a carboxylic acid, and may be produced by subjecting the alcohol component and the carboxylic acid component to polycondensation reaction.

(Alcohol Component)

Examples of the alcohol component as a raw material monomer of the polyester resin include polyols such as an aromatic polyol, an aliphatic polyol, and the like. Among these polyols, preferred is the aromatic diol.

The aromatic diol is preferably an alkyleneoxide adduct of bisphenol A. Meanwhile, the alkyleneoxide adduct of bisphenol A as used herein means a compound having such a structure that an oxyalkylene group is added to 2,2-bis(4-hydroxyphenyl)propane.

Specific examples of the preferred alkyleneoxide adduct of bisphenol A include those compounds represented by the following general formula (I-1).

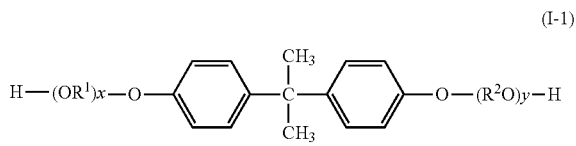

In the general formula (I-1), $OR^1$ and $R^2O$ are respectively an oxyalkylene group, and are preferably each independently an oxyalkylene group having not less than 1 and not more than 4 carbon atoms, and more preferably an oxyethylene group or an oxypropylene group.

The suffixes x and y each correspond to a molar number of addition of the alkyleneoxide. In addition, from the viewpoint of attaining good reactivity with the carboxylic acid component, an average value of a sum of x and y is preferably not less than 2. The average value of a sum of x and y is also preferably not more than 7, more preferably not more than 5 and even more preferably not more than 3.

In addition, the $OR^1$ groups in the number of x and the $R^2O$ groups in the number of y may be respectively the same or different from each other. From the viewpoints of improving adhesion properties of the resulting ink to a printing medium, the $R^1O$ groups and the $R^2O$ groups are respectively preferably identical to each other. These alkyleneoxide adducts of bisphenol A may be used alone or in combination of any two or more thereof. As the alkyleneoxide adduct of bisphenol A, preferred are a propyleneoxide adduct of bisphenol A and an ethyleneoxide adduct of bisphenol A, and more preferred is a propyleneoxide adduct of bisphenol A.

The content of the alkyleneoxide adduct of bisphenol A in the alcohol component is preferably not less than 50 mol %, more preferably not less than 60 mol % and even more preferably not less than 70 mol %, and is also preferably not more than 100 mol %, from the viewpoint of improving rub fastness of the resulting printed material.

The alcohol component as the raw material monomer of the polyester resin may also contain the other alcohol component(s) in addition to the alkyleneoxide adduct of bisphenol A. Specific examples of the other alcohol component(s) include ethylene glycol, propylene glycol (1,2-propanediol), glycerin, pentaerythritol, trimethylolpropane, hydrogenated bisphenol A, sorbitol, alkylene (having not less than 2 and not more than 4 carbon atoms) oxide adducts of these compounds (average molar number of addition of the alkyleneoxide: not less than 1 and not more than 16), and the like.

These other alcohol component(s) may be used alone or in combination of any two or more thereof.

(Carboxylic Acid Component)

The carboxylic acid component as a raw material monomer of the polyester resin includes carboxylic acids as well as anhydrides and alkyl (having not less than 1 and not more than 3 carbon atoms) esters of these carboxylic acids, and the like.

Examples of the carboxylic acid component include an aromatic dicarboxylic acid, an aliphatic dicarboxylic acid, an alicyclic dicarboxylic acid, a trivalent or higher-valent polycarboxylic acid and the like. Amount these carboxylic acid components, preferred is at least one compound selected from the group consisting of an aromatic dicarboxylic acid and an aliphatic dicarboxylic acid.

Specific examples of the preferred aromatic dicarboxylic acid include phthalic acid, isophthalic acid and terephthalic acid. Of these aromatic dicarboxylic acids, more preferred is terephthalic acid.

Specific examples of the aliphatic dicarboxylic acid include an unsaturated aliphatic dicarboxylic acid and a saturated aliphatic dicarboxylic acid. As the unsaturated aliphatic dicarboxylic acid, preferred are fumaric acid and maleic acid, and more preferred is fumaric acid. As the saturated aliphatic dicarboxylic acid, preferred are adipic acid and succinic acid.

Specific examples of the preferred alicyclic dicarboxylic acid include cyclohexanedicarboxylic acid, decalinedicarboxylic acid and tetrahydrophthalic acid. Specific examples of the preferred trivalent or higher-valent polycarboxylic acid include trimellitic acid and pyromellitic acid.

These carboxylic acid components may be used alone or in combination of any two or more thereof.

Among these carboxylic acid components, preferred are the aromatic dicarboxylic acid and the aliphatic dicarboxylic acid, more preferred is the aliphatic dicarboxylic acid, even more preferred is the unsaturated aliphatic dicarboxylic acid, and further even more preferred is fumaric acid. In addition, as the carboxylic acid component, there is also preferably used a combination of the unsaturated aliphatic dicarboxylic acid, and the aromatic dicarboxylic acid and/or the alicyclic dicarboxylic acid, and more preferably a combination of fumaric acid and terephthalic acid.

The content of the unsaturated aliphatic dicarboxylic acid in the carboxylic acid component is preferably not less than 25 mol %, more preferably not less than 40 mol %, even more preferably not less than 60 mol % and even more preferably not less than 70 mol %, and is also preferably not more than 100 mol %.

(Production of Polyester Resin)

The polyester resin may be produced by subjecting at least the alcohol component and the carboxylic acid component to polycondensation reaction. For example, the polyester resin may be produced by subjecting the aforementioned alcohol component and the aforementioned carboxylic acid component to polycondensation reaction in an inert gas atmosphere at a temperature of not lower than 180° C. and not higher than 250° C., if required in the presence of an esterification catalyst. The preferred forms and the preferred contents of the alcohol component and the carboxylic acid component are respectively the same as those described previously.

In the case where the obtained polyester resin is used in the form of resin particles, from the viewpoint of well controlling a particle size of the resin particles, it is preferred that the polyester resin has a sharp molecular weight distribution, and the polyester resin is preferably produced by polycondensation reaction using the esterification catalyst.

Examples of the esterification catalyst include tin catalysts, titanium catalysts, metal compounds such as antimony trioxide, zinc acetate, germanium dioxide, etc., and the like. Among these esterification catalysts, from the viewpoint of improving reaction efficiency of the esterification reaction, preferred are tin catalysts. Specific examples of the tin catalysts preferably used herein include dibutyl tin oxide, tin (II) di(2-ethyl hexanoate) or salts of these compounds, and the like. Among these tin catalysts, more preferred is tin (II) di(2-ethyl hexanoate).

Also, if required, an esterification co-catalyst such as 3,4,5-trihydroxybenzoic acid, etc., may be further used in the esterification reaction. In addition, a radical polymerization inhibitor such as 4-tert-butyl catechol, hydroquinone, etc., may also be used in combination with the aforementioned components, etc.

The acid value of the polyester resin is preferably not less than 5 mgKOH/g, more preferably not less than 10 mgKOH/g and even more preferably not less than 15 mgKOH/g, and is also preferably not more than 70 mgKOH/g, more preferably not more than 55 mgKOH/g, even more preferably not more than 45 mgKOH/g and further even more preferably not more than 35 mgKOH/g, from the viewpoint of improving rub fastness of the resulting printed material.

The softening point of the polyester resin is preferably not lower than 80° C., more preferably not lower than 85° C. and even more preferably not lower than 90° C., and is also preferably not higher than 160° C., more preferably not higher than 150° C. and even more preferably not higher than 140° C., from the viewpoint of improving rub fastness of the resulting printed material.

The glass transition temperature of the polyester resin is preferably not lower than 50° C. and more preferably not lower than 55° C., and is also preferably not higher than 90° C., more preferably not higher than 80° C., even more preferably not higher than 75° C. and further even more preferably not higher than 70° C., from the viewpoint of improving rub fastness of the resulting printed material.

The weight-average molecular weight of the polyester resin is preferably not less than 5,000, more preferably not less than 7,500 and even more preferably not less than 10,000 from the viewpoint of improving rub fastness of the resulting printed material, and is also preferably not more than 100,000, more preferably not more than 50,000 and even more preferably not more than 30,000 from the viewpoint of improving dispersion stability of the colorant.

The acid value, softening point, glass transition temperature and weight-average molecular weight of the polyester resin may be respectively adjusted to desired values by appropriately controlling the kinds and compounding ratios of the monomers used as well as the polycondensation reaction conditions such as a reaction temperature and a reaction time, to obtain the aimed polyester resin. In addition, the acid value, softening point, glass transition temperature and weight-average molecular weight of the polyester resin may be respectively measured by the methods described in Examples below.

<Other Resins>

The aqueous composition of the present invention may further contain the other resin(s) containing a reactive group that is capable of undergoing a crosslinking reaction with the carbodiimide compound (hereinafter also referred to merely as a "resin C") in combination with the polyester resin. By using the resin C in combination with the polyester resin in the aqueous composition, the coating film of the ink can be further enhanced in density of the crosslinked structure by forming the structure via the resin C, so that it is possible to obtain a much firmer coating film of the ink. The aforementioned reactive group may be such a reactive group that is capable of undergoing a crosslinking reaction with at least one group selected from the group consisting of an isocyanate group, a carbodiimide group and an oxazoline group. Specific examples of the reactive group include a carboxy group, a hydroxy group, an amino group, a thiol group and the like. Among these reactive groups, preferred is at least one reactive group selected from the group consisting of a carboxy group and a hydroxy group Examples of the resin C include a polyurethane resin, a (meth)acrylic resin, a styrene-(meth)acrylic resin, a (meth)acrylic-urethane resin and the like. Among these resins, preferred is a polyurethane resin containing a carboxy group. Meanwhile, in the case where the resin C is a copolymer, the resin C may be in the form of any of a random copolymer, a block copolymer, an alternating copolymer and a graft copolymer. Incidentally, the term "(meth)acrylic" as used herein means at least one selected from the group consisting of "acrylic" and "methacrylic".

The polyurethane resin containing a carboxy group may be produced, for example, by subjecting an organic compound containing two or more alcoholic hydroxy groups in a molecule thereof (polyol), which may include a dialkanol carboxylic acid, and a polyisocyanate to polyaddition reaction. Examples of the dialkanol carboxylic acid include dimethylol butanoic acid, dimethylol propionic acid and salts of these acids, etc. The polyol is not particularly limited as long as it contains two or more alcoholic hydroxy groups in a molecule thereof. Examples of the polyol include a polycarbonate polyol, a polyester polyol, a polyether polyol and the like. Examples of the polyisocyanate include an aliphatic diisocyanate having a chain-like or cyclic structure, an aromatic ring-containing aliphatic diisocyanate, an aromatic diisocyanate, modified products of these diisocyanates, and the like.

The polyurethane resin is preferably used in the form of an emulsion obtained by dispersing the polyurethane resin in a water-based medium. The emulsion of the polyurethane resin may also contain a dispersant such as a surfactant, etc., if required.

Specific examples of commercially available products of the polyurethane resin include "SUPERFLEX" series products available from DKS Co., Ltd., "SANCURE" series products available from The Lubrizol Corporation, "TAKE-LAC W" series products available from Mitsui Chemicals, Inc., "PERMARIN" series products available from Sanyo Chemical Industries, Ltd., "NeoRez R" series products available from DSM Coating Resins, Inc., "ADEKA BONTIGHTER HUX" series products available from ADEKA Corporation, and the like.

<Other Components>

(Colorant)

The aqueous composition of the present invention may also contain the below-mentioned colorant. As the colorant, from the viewpoint of improving water resistance of the resulting printed material, preferred is a pigment and a hydrophobic dye. Among these colorants, in order to allow the resulting printed material to exhibit higher weathering resistance, the pigment is preferably used. The aqueous composition containing the colorant may also be used as the below-mentioned water-based ink.

(Fixing Aid Polymer (Ib))

The aqueous composition of the present invention may also contain the below-mentioned fixing aid polymer (Ib) in order to fix the colorant on a printing medium.

(Water-Soluble Organic Solvent)

The aqueous composition of the present invention preferably further contains a water-soluble organic solvent from the viewpoint of improving storage stability and ink-jet ejection properties of the aqueous composition as well as from the viewpoint of improving rub fastness of the resulting printed material by forming a smooth coating film of the ink thereon.

The "water-soluble organic solvent" as used herein means such an organic solvent whose solubility in water as measured by dissolving the organic solvent in 100 mL of water at 25° C. is not less than 10 mL.

The boiling point of the water-soluble organic solvent is preferably not lower than 150° C., more preferably not lower than 160° C., even more preferably not lower than 170° C. and further even more preferably not lower than 180° C., and is also preferably not higher than 250° C., more preferably not higher than 240° C. and even more preferably not higher than 230° C.

In the case where two or more water-soluble organic solvents are used in combination with each other as the water-soluble organic solvent, the boiling point of the water-soluble organic solvent means a weighted mean value of boiling points of the respective water-soluble organic solvents which are weighted by contents (% by mass) of the organic solvents.

Examples of the water-soluble organic solvent include a polyhydric alcohol, a polyhydric alcohol alkyl ether, a nitrogen-containing heterocyclic compound, an amide, an amine, a sulfur-containing compound and the like. Of these organic solvents, from the viewpoint of improving ejection properties and storage stability of the aqueous composition and rub fastness of the resulting printed material, preferred is a polyhydric alcohol. The polyhydric alcohol may be used in the form of a mixed alcohol containing a plurality of compounds belonging to the concept of the polyhydric alcohol. A part of the polyhydric alcohol used herein may also be replaced with the polyhydric alcohol alkyl ether. In addition, when using the polyhydric alcohol alkyl ether as the water-soluble organic solvent, the polyhydric alcohol alkyl ether may be used in the form of a mixed polyhydric alcohol alkyl ether containing a plurality of compounds belonging to the concept of the polyhydric alcohol alkyl ether, similarly to the aforementioned polyhydric alcohol.

Examples of the polyhydric alcohol include ethylene glycol (boiling point (b.p.) 197° C.), propylene glycol (b.p. 188° C.), dipropylene glycol (b.p. 232° C.), polypropylene glycol, 1,3-propanediol (b.p. 210° C.), 2-methyl-1,3-propanediol (b.p. 214° C.), 1,2-butanediol (b.p. 192° C.), 1,3-butanediol (b.p. 208° C.), 1,4-butanediol (b.p. 230° C.), 3-methyl-1,3-butanediol (b.p. 203° C.), 1,5-pentanediol (b.p. 242° C.), 2-methyl-2,4-pentanediol (b.p. 196° C.), 1,2,6-hexanetriol (b.p. 178° C.), 1,2,4-butanetriol (b.p. 190° C.), 1,2,3-butanetriol (b.p. 175° C.), petriol (b.p. 216° C.) and the like. In addition, diethylene glycol (b.p. 244° C.), polyethylene glycol, 1,6-hexanediol (b.p. 250° C.), triethylene glycol (b.p. 285° C.), tripropylene glycol (b.p. 273° C.), glycerin (b.p. 290° C.) and the like may also be used in the present invention. These compounds having a boiling point higher than 240° C. are preferably used in combination with the aforementioned compounds having a boiling point lower than 240° C.

Examples of the polyhydric alcohol alkyl ether include alkylene glycol monoalkyl ethers, dialkylene glycol monoalkyl ethers, trialkylene glycol monoalkyl ethers and the like. Specific examples of the polyhydric alcohol alkyl ether include ethylene glycol monoethyl ether (b.p. 135° C.), ethylene glycol monobutyl ether (b.p. 171° C.), diethylene glycol monomethyl ether (b.p. 194° C.), diethylene glycol monoethyl ether (b.p. 202° C.), diethylene glycol monobutyl ether (b.p. 230° C.), triethylene glycol monomethyl ether (b.p. 122° C.), triethylene glycol monoisobutyl ether (b.p. 160° C.), tetraethylene glycol monomethyl ether (b.p. 158° C.), propylene glycol monoethyl ether (b.p. 133° C.), dipropylene glycol monomethyl ether (b.p. 190° C.), dipropylene glycol monobutyl ether (b.p. 227° C.), tripropylene glycol monomethyl ether (b.p. 243° C.), tripropylene glycol monobutyl ether and the like.

From the viewpoint of improving rub fastness of the resulting printed material, it is preferred that the water-soluble organic solvent contains the polyhydric alcohol. Among the polyhydric alcohols contained in the water-soluble organic solvent, more preferred are diols having not less than 3 and not more than 6 carbon atoms, even more preferred are diols having 3 or 4 carbon atoms, and further even more preferred is propylene glycol.

The content of the polyhydric alcohol in the water-soluble organic solvent is preferably not less than 60% by mass, more preferably not less than 80% by mass and even more preferably not less than 90% by mass.

(Contents of Respective Components in Aqueous Composition, Etc.)

The contents of the respective components in the aqueous composition are as follows from the viewpoint of improving storage stability of the aqueous composition and rub fastness of the resulting printed material.

The content of the carbodiimide compound in the aqueous composition is preferably not less than 0.1% by mass, more preferably not less than 0.3% by mass and even more preferably not less than 0.5% by mass, and is also preferably not more than 10% by mass, more preferably not more than 5% by mass and even more preferably not more than 3% by mass.

The content of the polyester resin in the aqueous composition is preferably not less than 0.5% by mass, more preferably not less than 1% by mass and even more preferably not less than 2% by mass, and is also preferably not more than 25% by mass, more preferably not more than 20% by mass and even more preferably not more than 15% by mass.

The mass ratio of the carbodiimide compound to the polyester resin (carbodiimide compound/polyester resin) is preferably not less than 0.01, more preferably not less than 0.02 and even more preferably not less than 0.03, and is also preferably not more than 0.5, more preferably not more than 0.4 and even more preferably not more than 0.3.

The content of the resin C in the aqueous composition is preferably not less than 0.1% by mass, more preferably not less than 0.3% by mass and even more preferably not less than 0.5% by mass, and is also preferably not more than 10% by mass, more preferably not more than 5% by mass and even more preferably not more than 3% by mass.

The content of the water-soluble organic solvent in the aqueous composition is preferably not less than 7% by mass, more preferably not less than 15% by mass and even more preferably not less than 25% by mass, and is also preferably not more than 48% by mass, more preferably not more than 46% by mass and even more preferably not more than 44% by mass.

The content of water in the aqueous composition is preferably not less than 20% by mass, more preferably not less than 25% by mass and even more preferably not less than 30% by mass, and is also preferably not more than 90% by mass, more preferably not more than 80% by mass, even more preferably not more than 70% by mass and further even more preferably not more than 60% by mass.

The content of the colorant in the aqueous composition is preferably not more than 1% by mass, more preferably not more than 0.1% by mass, even more preferably not more than 0.01% by mass and further even more preferably 0% by mass. If the aqueous composition contains substantially no colorant, the composition has no adverse influence on a hue of the water-based ink when printing characters or images using the water-based ink in combination with the aqueous composition.

The aqueous composition of the present invention may also contain various additives that may be usually used in a coating solution to be ejected by an ink-jetting method, etc., such as a dispersant, a surfactant, a viscosity modifier, a defoaming agent, an antiseptic agent, a mildew-proof agent, a rust preventive, and the like.

[Ink Set for Ink-Jet Printing]

The ink set for ink-jet printing contains at least two kinds of aqueous compositions. The respective aqueous compositions may also be in the form of a water-based ink.

The ink set for ink-jet printing according to the present invention (hereinafter also referred to merely as an "ink set") contains, as the aforementioned aqueous composition, an aqueous composition a containing a carbodiimide compound and water, and an aqueous composition b containing a polyester resin and water. At least one of the aqueous composition a and the aqueous composition b, preferably the aqueous composition b, may further contain a colorant to use the aqueous composition as a water-based ink containing the colorant.

In addition, the ink set for ink-jet printing according to the present invention contains an aqueous composition for ink-jet printing which contains the carbodiimide compound, the polyester resin and water, and the water-based ink containing the colorant (hereinafter also referred to merely as a "water-based ink" or an "ink").

The aforementioned ink set is loaded, for example, into ink cartridges for respective colors in an ink-jet printing apparatus, so that (i) the respective ink cartridges are filled with the aqueous composition a containing the carbodiimide compound and water and the aqueous composition b containing the polyester resin and water, if required together with the colorant, which can be ejected in the form of ink droplets from respective ejection nozzles corresponding to the respective ink cartridges to print characters or images, or (ii) the respective ink cartridges are filled with the aqueous composition for ink-jet printing which contains the carbodiimide compound, the polyester resin and water, and the water-based ink containing the colorant, which can be ejected in the form of ink droplets from respective ejection nozzles corresponding to the respective ink cartridges to print characters or images.

As the water-based ink, a water-based ink having a single kind of hue may be used alone, or water-based inks having two or more kinds of hues may be used in combination with each other.

<Water-Based Ink>

The water-based ink of the present invention is in the form of an aqueous composition containing a colorant.

(Colorant)

As the colorant contained in the water-based ink of the present invention, from the viewpoint of improving water resistance of the resulting printed material, there are preferably used a pigment and a hydrophobic dye. Among these colorants, in order to allow the resulting printed material to exhibit high weathering resistance, the pigment is preferably used.

(Pigment)

The pigment used in the present invention may be either an inorganic pigment or an organic pigment, and may also be used in the form of a lake pigment or a fluorescent pigment. In addition, the inorganic or organic pigment may also be used in combination with an extender pigment, if required.

Specific examples of the inorganic pigment include carbon blacks, metal oxides such as titanium oxide, iron oxide, red iron oxide, chromium oxide, etc., iridescent nacreous pigments, and the like. In particular, the carbon blacks are preferably used for black inks. Examples of the carbon blacks include furnace blacks, thermal lamp blacks, acetylene blacks, channel blacks and the like.

Specific examples of the organic pigment include azo pigments such as azo lake pigments, insoluble monoazo pigments, insoluble disazo pigments, chelate azo pigments, etc.; polycyclic pigments such as phthalocyanine pigments, perylene pigments, perinone pigments, anthraquinone pigments, quinacridone pigments, dioxazine pigments, thioindigo pigments, isoindolinone pigments, quinophthalone pigments, diketopyrrolopyrrole pigments, benzimidazolone pigments, threne pigments, etc.; and the like.

The hue of the pigment is not particularly limited, and there may be used any of achromatic color pigments having a white color, a black color, a gray color, etc.; and chromatic color pigments having a yellow color, a magenta color, a cyan color, a blue color, a red color, an orange color, a green color, etc.

Specific examples of the preferred organic pigments include at last one pigment selected from the group consisting of C.I. Pigment Yellow 13, 17, 74, 83, 93, 97, 109, 110, 120, 128, 138, 139, 151, 154, 155, 174 and 180; C.I. Pigment Red 48, 57:1, 122, 146, 150, 176, 184, 185, 188, 202 and 254; C.I. Pigment Orange; C.I. Pigment Violet 19 and 23; C.I. Pigment Blue 15, 15:1, 15:2, 15:3, 15:4, 16 and 60; C.I. Pigment Green 7 and 36; and the like.

Examples of the extender pigment include silica, calcium carbonate, talc and the like.

The aforementioned pigments may be used alone or in the form of a mixture of any two or more thereof.

The pigment may be contained in the water-based ink in the form of a self-dispersible pigment, a pigment dispersed in the water-based ink with a polymer dispersant, or pigment-containing polymer particles.

(Hydrophobic Dye)

As the hydrophobic dye, there are preferably used those dyes that are capable of being included in the polymer particles. Examples of the hydrophobic dye include oil-soluble dyes, disperse dyes and the like. Among these dyes, preferred are oil-soluble dyes.

From the viewpoint of allowing the hydrophobic dye to efficiently become included in the water-insoluble polymer particles, the solubility of the hydrophobic dye in an organic solvent used upon production of a water dispersion of the polymer particles is preferably not less than 2 g/L and more preferably from 20 to 500 g/L.

The oil-soluble dye is not particularly limited. From the viewpoint of improving water resistance of the resulting printed material, examples of the oil-soluble dye include C.I. Solvent Black 3, 7, 27, 29, 34 and 45; C.I. Solvent Yellow 14, 16, 29, 56, 82 and 83:1; C.I. Solvent Red 1, 3, 8, 18, 24, 27, 43, 49, 51, 72 and 73; C.I. Solvent Violet 3; C.I. Solvent Blue 2, 4, 11, 44, 64 and 70; C.I. Solvent Green 3, 7 and 7; C.I. Solvent Orange 2; and the like. In addition, as the oil-soluble dye, there may also be used those dyes obtained by transforming a water-soluble dye into an oil-soluble one.

Among these hydrophobic dyes, preferred are C.I. Solvent Yellow 29 and 30 for a yellow colorant, C.I. Solvent Blue 70 for a cyan colorant, C.I. Solvent Red 18 and 49 for a magenta colorant, and C.I. Solvent Black 3 and 7 as well as nigrosine-based black dyes for a black colorant.

These colorants may be used alone or in combination of any two or more thereof.

[Colorant Dispersing Polymer (Ia)]

As the colorant dispersing polymer (Ia) for dispersing the colorant, from the viewpoint of improving dispersibility of the colorant and rub fastness of the resulting printed material, there may be mentioned condensation-based resins such as polyester resins, polyurethane resins, etc.; vinyl-based resins that are obtained by addition-polymerizing a vinyl monomer (such as a vinyl compound, a vinylidene compound and a vinylene compound); and the like. Among these resins, preferred is at least one resin selected from the group consisting of the polyester resins and the vinyl-based resins, and more preferred are the polyester resins. The colorant dispersing polymer (Ia) used herein may be either an appropriately synthesized product or a commercially available product.

The colorant dispersing polymer (Ia) is preferably used in the form of a water dispersion thereof.

(Polyester Resin)

The polyester resin may be used as the colorant dispersing polymer (Ia) by incorporating the polyester resin into the aforementioned aqueous composition.

As described above, the polyester resin may be produced by subjecting the alcohol component and the carboxylic acid component to polycondensation reaction. The water dispersion of the polyester resin may also contain a dispersant such as a surfactant, if required.

The water dispersion of the polyester resin may be obtained by the method of adding the polyester resin to a water-based medium and then subjecting the resulting mixture to dispersion treatment using a disperser, etc., the method of gradually adding a water-based medium to the polyester resin and then subjecting the resulting mixture to phase inversion emulsification, and the like. Among these methods, from the viewpoint of enhancing productivity of the water dispersion and improving dispersion stability of the polymer particles, the method using the phase inversion emulsification is preferably used. As the phase inversion emulsification method, there may be mentioned, for example, the method described in JP 2016-222896A. More specifically, there is preferably used such a method in which the polyester resin is first dissolved in an organic solvent, and then a water-based medium is added to the resulting solution to subject the solution to phase inversion emulsification, followed by removing the organic solvent therefrom.

(Vinyl-Based Resin)

The vinyl-based resin preferably contains one or more constitutional units selected from the group consisting of a constitutional unit derived from an ionic monomer, a constitutional unit derived from a hydrophobic monomer and a constitutional unit derived from a hydrophilic nonionic monomer (hereinafter also referred to merely as a "nonionic monomer"), and more preferably two or more constitutional units selected from the group consisting of the aforementioned constitutional units. Examples of a combination of the monomers from which the two or more constitutional units of the vinyl-based resin are derived include a combination of the ionic monomer and the hydrophobic monomer, and a combination of the ionic monomer, the hydrophobic monomer and the nonionic monomer.

The vinyl-based resin may be produced, for example, by subjecting a monomer mixture containing the ionic monomer, the hydrophobic monomer and the nonionic monomer to addition polymerization by conventionally known methods.

The vinyl-based resin used in the water-based ink is preferably such a vinyl-based resin that contains a constitutional unit derived from at least one ionic monomer selected from the group consisting of acrylic acid and methacrylic acid, and a constitutional unit derived from at least one hydrophobic monomer selected from the group consisting of a (meth)acrylate containing a hydrocarbon group derived from an aliphatic alcohol, an aromatic group-containing monomer and a styrene-based macromonomer, and more preferably such a vinyl-based resin that further contains a constitutional unit derived from the nonionic monomer.

The weight-average molecular weight of the vinyl-based resin is preferably not less than 5,000, more preferably not less than 10,000 and even more preferably not less than 30,000, and is also preferably not more than 100,000, more preferably not more than 80,000 and even more preferably not more than 60,000, from the viewpoint of improving dispersibility of the colorant as well as rub fastness of the resulting printed material.

The acid value of the vinyl-based resin is preferably not less than 50 mgKOH/g, more preferably not less than 100 mgKOH/g and even more preferably not less than 150 mgKOH/g from the viewpoint of improving dispersibility of the colorant.

Specific examples of commercially available products of the vinyl-based resin include polyacrylic acids such as "ARON AC-10SL" available from Toagosei Co., Ltd., etc.; styrene-acrylic resins such as "JONCRYL 67", "JONCRYL 611", "JONCRYL 678", "JONCRYL 680", "JONCRYL 690" and "JONCRYL 819" all available from BASF Japan, Ltd., etc.; and the like.

The weight-average molecular weight and the acid value of the vinyl-based resin may be respectively measured by the methods described in Examples below.

[Fixing Aid Polymer (Ib)]

The water-based ink used in the present invention may also contain a fixing aid polymer (Ib) for fixing the colorant on a printing medium.

The fixing aid polymer (Ib) is preferably used in the form of colorant-free polymer particles. As the component of the pigment-free polymer particles, there may be mentioned condensation-based resins such as polyurethane resins, polyester resins, etc.; and vinyl-based resins such as acrylic resins, styrene-based resins, styrene-acrylic resins, butadiene-based resins, styrene-butadiene-based resins, vinyl chloride-based resins, vinyl acetate-based resins, acrylic-silicone-based resins, etc. Among these resins, from the viewpoint of improving rub fastness and substrate adhesion properties of the resulting printed material, preferred are polyester resins and acrylic resins, and more preferred are polyester resins.

In addition, from the viewpoint of enhancing productivity of the water-based ink, the fixing aid polymer (Ib) is preferably used in the form of a water dispersion containing the polymer particles. As the fixing aid polymer (Ib), there may be used either an appropriately synthesized product or a commercially available product.

Examples of the commercially available product of the fixing aid polymer (Ib) include polyester resins such as "elitel KA" series products and "elitel KZA" series product both available from UNITIKA, Ltd., etc.; polyurethane resins such as "WBR" series products available from Taisei Fine Chemical Co., Ltd., etc.; acrylic resins such as "Neocryl A-1127" available from DSM Coating Resins, Inc., "JONCRYL" series products available from BASF Japan, Ltd., etc.; styrene-butadiene resins such as "SR" series products available from Nippon A & L Inc., etc.; vinyl chloride-based resins such as "VINYBLAN" series products available from Nissin Chemical Co., Ltd., etc.; and the like.

The weight-average molecular weight of the fixing aid polymer (Ib) is preferably not less than 10,000 and more preferably not less than 15,000, and is also preferably not more than 100,000 and more preferably not more than 50,000, from the viewpoint of improving rub fastness of the resulting printed material.

The average particle size of particles of the fixing aid polymer (Ib) in the aqueous dispersion or ink containing the particles of the fixing aid polymer (Ib) is preferably not less than 10 nm, more preferably not less than 30 nm and even more preferably not less than 50 nm, and is also preferably not more than 300 nm, more preferably not more than 200 nm, even more preferably not more than 150 nm and further even more preferably not more than 130 nm, from the viewpoint of improving storage stability of the resulting ink.

The weight-average molecular weight and the average particle size of the fixing aid polymer (Ib) may be measured by the respective methods described in Examples below.

The water-based ink preferably contains water-insoluble polymer particles containing the colorant, in particular, the pigment (hereinafter also referred to merely as "pigment-containing polymer particles") from the viewpoint of improving dispersion stability and ejection stability of the resulting ink. The pigment-containing polymer particles may have any configuration as long as the particles are formed of the pigment and the water-insoluble polymer.

(Production of Pigment-Containing Polymer Particles)

The pigment-containing polymer particles are preferably efficiently produced in the form of a water dispersion thereof by the process including the following steps 1 and 2.

Step 1: subjecting a mixture containing the pigment and the polymer as well as an organic solvent and water to dispersion treatment to obtain a dispersion of the pigment-containing polymer particles; and Step 2: removing the organic solvent from the dispersion of the pigment-containing polymer particles obtained in the step 1 to obtain a water dispersion of the pigment-containing polymer particles.

As described above, the pigment dispersing polymer used for dispersing the pigment is preferably at least one resin selected from the group consisting of a polyester resin and a vinyl-based resin, and more preferably a polyester resin. In the following, the case where the polyester resin is used as the pigment dispersing polymer is explained. However, the explanation can also be applied to the case using the vinyl-based resin as the pigment dispersing polymer.

In the step 1, there is preferably used the method in which the polyester resin is first dissolved in the organic solvent, and then the pigment and water, if required together with a neutralizing agent, a surfactant and the like, are added to and mixed in the resulting organic solvent solution to obtain a dispersion of an oil-in-water type. The organic solvent used for dissolving the polyester resin is not particularly limited. As the organic solvent, preferred are ketones, ethers, esters, aliphatic alcohols having not less than 1 and not more than 3 carbon atoms, etc., and more preferred are ketones. When the polyester resin has been synthesized by a solution polymerization method, the solvent used in the solution polymerization may be directly used as such in the step 1.

In the case where the polyester resin contains an acid group, the acid group may be neutralized using a neutralizing agent. Examples of the neutralizing agent include bases such as lithium hydroxide, sodium hydroxide, potassium hydroxide, ammonia, various amines, etc. Among these neutralizing agents, preferred is sodium hydroxide. In addition, the polyester resin may be previously neutralized.

The equivalent (mol %) of the neutralizing agent used on the basis of the acid group contained in the polyester resin is preferably not less than 10 mol %, more preferably not less than 20 mol % and even more preferably not less than 30 mol %, and is also preferably not more than 300 mol %, more preferably not more than 200 mol % and even more preferably not more than 150 mol %, from the viewpoint of improving dispersion stability of the polyester resin in the water medium.

Meanwhile, the equivalent (mol %) of the neutralizing agent used may be calculated according to the following formula. When the equivalent of the neutralizing agent used is not more than 100 mol %, the equivalent of the neutralizing agent used has the same meaning as the degree of neutralization of a resin to be neutralized. On the other hand, when the equivalent of the neutralizing agent used as calculated according to the following formula exceeds 100 mol %, it means that the neutralizing agent is present in an excessively large amount relative to the acid group of the resin, and in such a case, the degree of neutralization of the polyester resin PA is regarded as being 100 mol %.

Equivalent (mol %) of neutralizing agent used=
[{mass (g) of neutralizing agent added/equivalent of neutralizing agent}/[{acid value of polyester $PA$ (mgKOH/g)×mass (g) of polyester $PA$}/(56×1,000)]]×100.

The dispersing method used in the step 1 is not particularly limited. The pigment-containing polymer particles may be atomized into fine particles having a desired average particle size only by substantial dispersion treatment. However, it is preferred that the mixture is first subjected to preliminary dispersion treatment, and then further to the substantial dispersion treatment by applying a shear stress thereto so as to control the average particle size of the pigment-containing polymer particles to a desired value.

As a means for conducting the preliminary dispersion treatment, there are preferably used ordinary mixing and stirring devices such as anchor blades, disper blades and the like. Of these devices, preferred are high-speed stirring mixers.

As a means for applying a shear stress to the mixture in the substantial dispersion treatment, there may be used, for example, kneading machines such as roll mills, kneaders, etc., high-pressure homogenizers such as "Microfluidizer" (tradename) available from Microfluidics Corporation, etc., and media-type dispersers such as paint shakers, beads mills, etc. These devices may be used in combination of any two or more thereof. Among these devices, the high-pressure homogenizers are preferably used.

The pressure used in the aforementioned dispersion treatment is preferably not less than 50 MPa, more preferably not less than 100 MPa and even more preferably not less than 120 MPa, and is also preferably not more than 250 MPa and more preferably not more than 200 MPa, from the viewpoint of reducing the particle size of the pigment-containing polymer particles and enhancing dispersion treatment efficiency.

In the step 2, the organic solvent is preferably substantially completely removed from the water dispersion of the pigment-containing polymer particles obtained in the step 1. However, the residual organic solvent may be present in the water dispersion unless the objects and advantageous effects of the present invention are adversely affected by the residual organic solvent.

The water dispersion of the pigment-containing polymer particles is in the form of a dispersion prepared by dispersing the polyester-based resin particles containing the pigment in a water medium containing water as a main medium.

Examples of the configuration of the pigment-containing polymer particles include the particle configuration in which the pigment is enclosed in the polymer, the particle configuration in which the pigment is uniformly dispersed in the polymer, and the particle configuration in which the pigment is exposed onto a surface of the respective polymer particles, etc., as well as a mixture of these particle configurations.

The average particle size of the pigment-containing polymer particles is preferably not less than 40 nm, more preferably not less than 50 nm and even more preferably not less than 60 nm, and is also preferably not more than 400 nm, more preferably not more than 250 nm, even more preferably not more than 200 nm and further even more preferably not more than 170 nm, from the viewpoint of improving rub fastness of the resulting printed material.

The average particle size of the pigment-containing polymer particles may be measured by the method described in Examples below.

(Optional Components of Water-Based Ink)

The water-based ink contains the colorant and the colorant dispersing polymer (Ia), and may further contain the fixing aid polymer (Ib) and an organic solvent, if required. Examples of the preferred organic solvent used in the water-based ink include such water-soluble organic solvents as used in the aforementioned aqueous composition. In addition, the water-based ink may also contain, as optional components, various additives such as a humectant, a wetting agent, a penetrant, a surfactant, a viscosity modifier, a defoaming agent, an antiseptic agent, a mildew-proof agent, a rust preventive, etc.

The water-based ink may be produced by mixing the colorant, the colorant dispersing polymer (Ia) and water, if required together with a neutralizing agent, a surfactant, an organic solvent, etc., followed by stirring the resulting mixture.

In the case where the water-based ink contains the pigment-containing polymer particles, after previously subjecting the pigment and the pigment dispersing polymer to dispersion treatment to obtain a dispersion of the pigment-containing polymer particles, the thus obtained dispersion may be compounded with the ink.

(Contents of Respective Components in Water-Based Ink)

The contents of the respective components in the water-based ink are as follows.

The content of the pigment in the ink is preferably not less than 1% by mass, more preferably not less than 2% by mass and even more preferably not less than 3% by mass from the viewpoint of enhancing optical density of the resulting printed material, and is also preferably not more than 15% by mass, more preferably not more than 10% by mass, even more preferably not more than 8% by mass and further even more preferably not more than 6% by mass from the viewpoint of improving rub fastness of the resulting printed material.

Incidentally, in the case where both of the pigment dispersing polymer (Ia) and the fixing aid polymer (Ib) are contained in the water-based ink, the content of a resin I in the water-based ink is a total content of the pigment dispersing polymer (Ia) and the fixing aid polymer (Ib) in the water-based ink.

The content of water in the ink is preferably not less than 30% by mass, more preferably not less than 40% by mass and even more preferably not less than 50% by mass, and is also preferably not more than 80% by mass, more preferably not more than 75% by mass and even more preferably not more than 70% by mass, from the viewpoint of improving rub fastness of the resulting printed material.

In the case where the water-based ink contains the organic solvent, the content of the organic solvent in the ink is preferably not less than 5% by mass, more preferably not less than 10% by mass and even more preferably not less than 20% by mass, and is also preferably not more than 60% by mass, more preferably not more than 50% by mass and even more preferably not more than 40% by mass, from the viewpoint of improving ejection properties of the resulting ink as well as rub fastness of the resulting printed material.

[Ink-Jet Printing Method]

In the ink-jet printing method of the present invention, the carbodiimide compound and the polyester resin are allowed to undergo a crosslinking reaction with each other on a surface of a printing medium to form a firm coating film of the ink on the surface of the printing medium, so that it is possible to improve rub fastness of the resulting printed material.

From the viewpoint of improving rub fastness of the resulting printed material, the ink-jet printing method of the present invention includes the following steps 1 and 2.

Step 1: ejecting the carbodiimide compound, the polyester resin, the colorant and water onto the surface of the printing medium by an ink-jetting method to print characters or images thereon; and Step 2: subjecting the characters or images printed in the step 1 to heat treatment at a temperature of not lower than 50° C. and not higher than 200° C.

As the aqueous composition to be ejected onto the surface of the printing medium by the ink-jet printing method, there are mentioned the aqueous composition according to the first embodiment which is ejected from one ejection head (i.e., the aqueous composition containing the carbodiimide compound, the polyester resin and water), and a combination of the aqueous compositions according to the second embodiment which are separately ejected from two ejection heads (i.e., a combination of the aqueous composition a containing the carbodiimide compound and water, and the aqueous composition b containing the polyester resin and water). When using the combination of the aqueous compositions according to the second embodiment, the aqueous compositions a and b are mixed with each other on the surface of the printing medium. In any of the first and second embodiments, as the aqueous composition(s), there may be the water-based ink containing the colorant.

(Step 1)

The step 1 is the step of ejecting the carbodiimide compound, the polyester resin, the colorant and water onto the surface of the printing medium by an ink-jetting method to print characters or images thereon.

The step 1 preferably further includes the step 1a of ejecting the water-based ink onto the printing medium by an ink-jetting method and the step 1b of ejecting the aqueous composition onto the printing medium by an ink-jetting method. It is more preferred that the step 1a is conducted before or simultaneously with the step 1b, and it is even more preferred that the step 1a is conducted before the step 1b.

By conducting the step 1a before the step 1b, it is possible to more effectively obtain a printed material that is excellent in rub fastness. In this case, the elapsed time period from the time at which the water-based ink is applied to the printing medium to the time at which the aqueous composition is applied to the printing medium is not particularly limited.

The colorant may be compounded in the water-based ink, the carbodiimide compound may be compounded in at least one of the water-based ink and the aqueous composition, and the polyester resin may be compounded in at least one of the water-based ink and the aqueous composition. Among these combinations of the water-based ink and the aqueous composition, preferred are the combination of the aqueous composition containing the carbodiimide compound and the water-based ink containing the polyester resin, and the combination of the aqueous composition containing the carbodiimide compound and the polyester resin, and the water-based ink.

The ink-jetting method of ejecting the aqueous composition and the water-based ink is preferably a piezoelectric method from the viewpoint of improving ejection properties thereof.

The amount of the aqueous composition applied onto the printing medium in terms of a solid content thereof is preferably not less than 0.1 g/m$^2$, more preferably not less than 0.75 g/m$^2$ and even more preferably not less than 1.5 g/m$^2$, and is also preferably not more than 5.0 g/m$^2$, more preferably not more than 3.5 g/m$^2$ and even more preferably not more than 2.0 g/m$^2$, from the viewpoint of improving rub fastness of the resulting printed material.

The amount of the water-based ink applied onto the printing medium in terms of a solid content thereof is preferably not less than 0.5 g/m$^2$, more preferably not less than 1.5 g/m$^2$ and even more preferably not less than 2.0 g/m$^2$, and is also preferably not more than 10 g/m$^2$, more preferably not more than 7.5 g/m$^2$ and even more preferably not more than 5.0 g/m$^2$, from the viewpoint of improving rub fastness of the resulting printed material.

(Step 2)

The step 2 is the step of subjecting the characters or images printed in the step 1 to heat treatment at a temperature of not lower than 50° C. and not higher than 200° C. By conducting the step 2, it is possible to form a firm coating film of the ink. The crosslinking reaction is preferably conducted by subjecting the printing medium on which the characters or images are printed to the heat treatment.

The method of conducting the heat treatment is not particularly limited. The heat treatment may be conducted by (i) a method of applying a hot air to the surface of the printing medium to heat the printed characters or images formed thereon, (ii) a method of approaching a heater to the surface of the printing medium to heat the printed characters or images formed thereon, (iii) a method of bringing a heater into contact with a surface of the printing medium opposed to its surface on which the printed characters or images are formed, to heat the printed characters or images, (iv) a method of heating the surface of the printed characters or images formed on the printing medium by steam curing using a high-temperature steam under an ordinary pressure or under a high pressure, and the like.

The heating temperature is preferably not lower than 90° C., more preferably not lower than 100° C. and even more preferably not lower than 110° C., and is also preferably not higher than 200° C., more preferably not higher than 170° C. and even more preferably not higher than 150° C. In the case where a shrink film is used as the printing medium, by heating the shrink film that is kept in such a state as attached to an aimed object, it is possible to conduct the crosslinking reaction of the printed characters or images and adhesion of the shrink film to the object by shrinkage thereof at the same time only during the single step.

The heating time is preferably not less than 1 minute, more preferably not less than 3 minutes and even more preferably not less than 5 minutes, and is also preferably not more than 30 minutes, more preferably not more than 20 minutes and even more preferably not more than 15 minutes.

Furthermore, it is preferred that before conducting the step 2, the step of drying the printed characters or images obtained in the step 1 is conducted. In the drying step, the crosslinking reactions between the carbodiimide compound and the polyester resin and between these compounds and the other resin(s) are allowed to proceed, so that the printed characters or images can be efficiently subjected to crosslinking reaction in a stepwise manner.

The drying temperature is preferably not lower than 30° C. and more preferably not lower than 40° C., and is also preferably lower than 100° C., more preferably not higher than 80° C. and even more preferably not higher than 60° C. In the case where the drying temperature is not lower than 50° C., the drying treatment also acts as the aforementioned heat treatment.

The drying time is preferably not less than 1 minute and more preferably not less than 2 minutes, and is also preferably not more than 20 minutes, more preferably not more than 10 minutes and even more preferably not more than 5 minutes.

The printing medium used in the ink-jet printing method of the present invention is not particularly limited.

Examples of the printing medium used herein include a high-water absorbing plain paper, a low-water absorbing coated paper and a low-water absorbing resin film. Among these printing media, from the viewpoint of improving commercial or industrial printing capability, preferred are a low-water absorbing coated paper and a low-water absorbing resin film, and more preferred is a low-water absorbing resin film.

The term "low-water absorbing" of the printing medium as used herein means a concept including both of low-water absorbing properties and non-water absorbing properties of the printing medium against water and/or the ink, and the "low-water absorbing" may be evaluated by absorption of pure water to the printing medium. More specifically, the "low-water absorbing" means that the water absorption of the printing medium as measured by contacting the printing medium with pure water for 100 milliseconds is not less than 0 g/m$^2$ and not more than 10 g/m$^2$, and preferably not less than 0 g/m$^2$ and not more than 6 g/m$^2$.

Specific examples of the coated paper include a versatile glossy coated paper, a multi-color foam glossy coated paper, and the like.

As the resin film, preferred is at least one film selected from the group consisting of a polyester film, a polyvinyl chloride film, a polypropylene film and a polyethylene film. The surface of the resin film on which the printed characters or images are formed may be subjected to corona treatment.

Specific examples of commercially available products of the resin film include "LUMIRROR T60" (polyester) available from Toray Industries Inc., "PVC80B P" (polyvinyl chloride) available from Lintec Corporation, "KINATH KEE 70CA" (polyethylene) available from Lintec Corporation, "YUPO SG90 PAT1" (polypropylene) available from Lintec Corporation, "FOR" and "FOA" (polypropylene) both available from Futamura Chemical Co, Ltd., "BONYL RX" (nylon) available from Kohjin Film & Chemicals Co., Ltd., "EMBLEM ONBC" (nylon) available from UNITIKA Ltd., and the like.

Examples of the shrink film that undergoes contraction upon heating include films formed of at least one thermoplastic resin selected from the group consisting of polyester-based resins; styrene-based resins such as polystyrene, a styrene-butadiene copolymer, etc.; polylactic acids; polyolefin-based resins such as polyethylene, polypropylene, etc.; vinyl chloride-based resins; a mixture of any two or more of these resins; and the like, as well as a laminated film of these films.

Specific examples of commercially available products of the shrink film include "SPACECLEAN 57042" available from TOYOBO Co., Ltd.; "DXL" series products, "HISHIPET" series products, "PLABIO" series products and "HYBREX DL" series products all available from Mitsubishi Chemical Corporation; "BONSET" series products available from C.I. TAKIRON Corporation; "FANCYWRAP PET" series products available from GUNZE Ltd.; and the like.

EXAMPLES

In the following Production Examples, Preparation Examples, Examples and Comparative Examples, the "part(s)" and "%" indicate "part(s) by mass" and "% by mass", respectively, unless otherwise specified. Various properties of the resins, etc., were measured by the following methods.

<Measurement of Properties of Polyester Resin>
(1) Acid Value of Polyester Resin The acid value of the polyester resin was measured by the same neutralization titration method as prescribed in JIS K 0070: 1992 except that only a mixed solvent of ethanol and ether used as a measuring solvent in the method was replaced with a mixed solvent containing acetone and toluene at a volume ratio [acetone:toluene] of 1:1.

(2) Softening Point of Polyester Resin

Using a flow tester "CFT-500D" available from Shimadzu Corporation, 1 g of a sample to be measured was extruded through a nozzle having a die pore diameter of 1 mm and a length of 1 mm while heating the sample at a temperature rise rate of 6° C./minute and applying a load of 1.96 MPa thereto by a plunger. The softening point of the sample was determined as the temperature at which a half amount of the sample was flowed out when plotting a downward movement of the plunger of the flow tester relative to the temperature.

(3) Glass Transition Temperature of Polyester Resin

Using a differential scanning calorimeter "Pyris 6 DSC" (tradename) commercially available from PerkinElmer Co., Ltd., a sample to be measured was weighed in an amount of 5 mg in an aluminum pan, and heated to 200° C. and then cooled from 200° C. to 0° C. at a temperature drop rate of 10° C./minute, and thereafter heated again at a temperature rise rate of 10° C./minute to prepare an endothermic characteristic curve thereof. The temperature at which an extension of a baseline below an endothermic maximum peak temperature on the curve was intersected with a tangential line having a maximum inclination of the curve in the range of from a rise-up portion to an apex of the peak was read as a glass transition temperature of the sample.

Meanwhile, in the case were the sample was in the form of a water dispersion, the water dispersion was freeze-dried at −10° C. for 9 hours using a freeze dryer "FDU-2100" available from Tokyo Rika Kikai Co., Ltd., and the thus obtained freeze-dried product was used as the sample.

(4) Weight-Average Molecular Weights (Mw) of Polyester Resin
(i) Preparation of Sample Solution A polyester resin to be measured was dissolved in chloroform to prepare a solution of the polyester resin having a concentration of 0.5 g/100 mL. Next, the resulting solution was subjected to filtration treatment by passing the solution through a fluororesin filter "FP-200" (tradename) having a pore size of 2 μm available from Sumitomo Electric Industries, Ltd., to remove insoluble components therefrom, thereby preparing a sample solution.

(ii) Measurement of Weight-Average Molecular Weight

The weight-average molecular weight of the polyester resin was measured by gel permeation chromatography under the following conditions.

Measuring Apparatus: "CO-8010" available from Tosoh Corporation

Analytical Columns: "GMHXL"+"G3000HXL" both available from Tosoh Corporation

Tetrahydrofuran as an eluent was allowed to flow through the analytical columns at a flow rate of 1 mL/minute, and the columns were stabilized in a thermostat at 40° C., and then 100 μL of the sample solution was injected into the columns to measure a molecular weight of the sample.

The weight-average molecular weight of the sample was calculated on the basis of a calibration curve previously prepared. The calibration curve of the molecular weight was prepared by using the following several kinds of monodisperse polystyrenes (monodisperse polystyrenes having weight-average molecular weights (Mw) of $2.63 \times 10^3$, $2.06 \times 10^4$ and $1.02 \times 10^5$ all available from Tosoh Corporation as well as monodisperse polystyrenes having weight-average molecular weights (Mw) of $2.10 \times 10^3$, $7.00 \times 10^3$ and $5.04 \times 10^4$ all available from GL. Sciences Inc.) as reference standard samples.

<Measurement of Properties of Styrene-Acrylic Resin>
(1) Weight-Average Molecular Weight (Mw) of Styrene-Acrylic Resin The weight-average molecular weight of the styrene-acrtlic resin was measured by gel permeation chromatography [GPC apparatus: "HLC-8320GPC" available from Tosoh Corporation; columns: "TSKgel Super AWM-H", "TSKgel Super AW3000" and "TSKgel guard column Super AW-H" all available from Tosoh Corporation; flow rate: 0.5 mL/min] using a solution prepared by dissolving phosphoric acid and lithium bromide in N,N-dimethylformamide such that concentrations of phosphoric acid and lithium bromide in the resulting solution were 60 mmol/L and 50 mmol/L, respectively, as an eluent, and using kits of monodisperse polystyrenes having previously known molecular weights [PStQuick B(F-550, F-80, F-10, F-1, A-1000), PStQuick C(F-288, F-40, F-4, A-5000, A-500] all available from Tosoh Corporation as a reference standard substance.

The measuring sample used in the aforementioned measurement was prepared by mixing 0.1 g of the resin with 10 mL of the aforementioned eluent in a glass vial, stirring the resulting mixture at 25° C. for 10 hours using a magnetic stirrer, and then subjecting the mixture to filtration treatment through a syringe filter "DISMIC-13HP PTFE" (0.2 μm) available from Advantec Co., Ltd.

(2) Acid Value of Styrene-Acrylic Resin

In an automatic potentiometric titrator (power burette; "Model No.: APB-610") available from Kyoto Electronics Manufacturing Co., Ltd., the polymer was dissolved in a titrant solution prepared by mixing toluene and acetone (2:1), and the resulting solution was subjected to titration with a 0.1N potassium hydroxide/ethanol solution by a potentiometric titration method until reaching an end point of the titration observed as an inflection point of the titration curve. The acid value of the polymer was calculated from an amount (titer) of the potassium hydroxide solution used in the titration until reaching the end point.

<Others>
(1) Solid Content of Pigment Water Dispersion

Sodium sulfate dried to constant weight in a desiccator was weighed in an amount of 10.0 g and charged into a 30 mL polypropylene container (inner diameter: 40 mm; height: 30 mm), and 1.0 g of a sample to be measured was added to the container, and the contents of the container were mixed with each other to obtain a mixture. Then, the resulting mixture was weighed, and maintained in the container at 105° C. for 2 hours to remove volatile components therefrom. The mixture was further allowed to stand in a desiccator for 15 minutes to measure a mass of the mixture after removing the volatile components therefrom. The mass of solids of the sample after removing the volatile components therefrom was determined by subtracting the mass of the sodium sulfate from the mass of the mixture after removing the volatile components therefrom. The solid content (%) of the sample was calculated by dividing the mass of solids of the sample after removing the volatile components therefrom by the mass of the sample before removing the volatile components therefrom.

(2) Average Particle Sizes of Pigment-Containing Polymer Particles and Pigment-Free Polymer Particles The cumulant analysis of the respective polymer particles was conducted using a laser particle analyzing system "ELS-8000" available from Otsuka Electrics Co., Ltd., to measure an average particle size thereof. In the measurement, there was used a dilute dispersion prepared by diluting a dispersion of the particles with water such that a concentration of the particles in the dispersion was adjusted to about 5×10$^{-3}$% by weight. The measurement was conducted under the conditions including a temperature of 25° C., an angle between incident light and detector of 90° and a cumulative number of 100 times, and a refractive index of water (1.333) was input to the analyzing system as a refractive index of the dispersing medium. The thus measured cumulant average particle size was defined as an average particle size of the pigment-containing polymer particles or the polymer particles.

Production Examples 1 and 2 (Production of Polyester Resins P-1 and P-2)

The respective raw material monomers (alcohol component and carboxylic acid component), the esterification catalyst and the esterification co-catalyst as shown in Table 1 were compounded with each other in amounts shown in Table 1, and charged into a 10 L-capacity four-necked flask equipped with a thermometer, a stirring device, a flow-down type condenser and a nitrogen inlet tube. The contents of the flask were reacted at 210° C. for 10 hours in a nitrogen atmosphere using a mantle heater, and then the reaction was further continued until a softening point of the resulting polymer as measured under −8.3 kPa (G) reached the temperature shown in Table 1, thereby obtaining respective polyester resins P-1 and P-2. Various properties of the thus obtained polyester resins are shown in Table 1.

TABLE 1

|  | Polyester resin |  | Production Example 1 P-1 | | Production Example 2 P-2 | |
|---|---|---|---|---|---|---|
|  |  |  | g | mole part(s)[*1] | g | mole part(s)[*1] |
| Raw material monomers | Alcohol component | BPA-PO[*2] | 3718 | 100 | 5740 | 100 |
|  | Carboxylic acid component | Terephthalic acid | — | — | 1633 | 60 |
|  |  | Fumaric acid | 1282 | 104 | 571 | 30 |
|  |  | Trimellitic anhydride | — | — | 378 | 12 |
| Esterification catalyst | Tin (II) di(2-ethyl hexanoate) [g] |  | 25 |  | 40 |  |
| Esterification co-catalyst | 3,4,5-Trihydroxybenzoic acid [g] |  | 0.25 |  | — |  |
| Properties of polyester resin | Acid value [mgKOH/g] |  | 22.4 |  | 31.0 |  |
|  | Softening point [°C.] |  | 100.9 |  | 122.0 |  |
|  | Glass transition temperature [°C.] |  | 58.5 |  | 72.0 |  |
|  | Weight-average molecular weight |  | 13700 |  | 20700 |  |

Note
[*1]Mole part(s) on the basis of 100 mole parts of a whole amount of the alcohol component
[*2]Polyoxypropylene (2.2)-2,2-bis(4-hydroxyphenyl)propane Preparation Example A1 (Preparation of Water Dispersion of Pigment-Containing Polyester Resin Particles)

(1) Step 1 (Pigment Dispersing Step)

In a 2 L-capacity container, 66.7 g of the polyester resin P-1 was dissolved in 198.6 g of methyl ethyl ketone (MEK). A 5N sodium hydroxide aqueous solution was added to the resulting polymer solution such that 85 mol % of an acid value of the polyester resin P-1 was neutralized, and 390.5 g of ion-exchanged water was further added dropwise thereto over 30 minutes. The resulting reaction solution was stirred and mixed at a temperature of not lower than 10° C. and not higher than 15° C. using a disper blade operated at 1,500 r/min for 15 minutes.

Then, 100 g of carbon black "MONARCH 717" available from Cabot Corporation was added to the reaction solution, and the resulting mixture was stirred and mixed at a temperature of not lower than 10° C. and not higher than 15° C. using a disper blade operated at 6,500 r/min for 2 hours to obtain a preliminary dispersion.

The resulting preliminary dispersion was subjected to filtration treatment through a 200-mesh filter, and then diluted by adding 36.1 g of ion-exchanged water thereto. Thereafter, the thus obtained diluted dispersion was subjected to dispersion treatment under a pressure of 150 MPa using a Microfluidizer "M-110EH-30XP" (high-pressure homogenizer) available from Microfluidics Corporation by passing the dispersion through the device 15 times, thereby obtaining a water dispersion of pigment-containing polyester resin particles.

(2) Step 2 (Concentration Step)

A 2 L eggplant-shaped flask was charged with the whole amount of the pigment water dispersion liquid obtained in the step 1, and then ion-exchanged water was added thereto such that a solid content of the dispersion liquid was adjusted to 15%. The resulting dispersion was maintained under a pressure of 0.09 MPa (abs) in a warm water bath adjusted to 32° C. for 3 hours using a rotary distillation apparatus "Rotary Evaporator N-1000S" available from Tokyo Rikakikai Co., Ltd., operated at a rotating speed of 50 r/min to remove the organic solvent therefrom. Furthermore, the temperature of the warm water bath was adjusted to 62° C., and the pressure in the apparatus was reduced to 0.07 MPa (abs), and the resulting reaction solution was concentrated under this condition until a solid content of the reaction solution became 25%.

The thus obtained concentrated solution was charged into a 500 mL angle rotor, and subjected to centrifugal separation using a high-speed cooling centrifuge "himac CR22G" (temperature set: 20° C.) available from Hitachi Koki Co., Ltd., at 3,660 r/min for 20 minutes. Thereafter, the resulting liquid layer portion was subjected to filtration treatment through a membrane filter "Minisart" (having a pore size of 5 μm) available from Sartorius Inc., and then the resulting filtered product was diluted with water such that a solid content thereof was adjusted to 22%, thereby obtaining a water dispersion 1 of the pigment-containing polyester resin particles.

The average particle size of the thus obtained pigment-containing polyester resin particles was 97 nm.

Preparation Examples A2 to A6 (Preparation of Water Dispersions 2 to 6 of Pigment-Containing Polyester Resin Particles)

The same procedure as in Preparation Example A1 was repeated except that the polyester resin and the pigment used therein were replaced with those shown below, thereby obtaining water dispersions 2 to 6 of pigment-containing polyester resin particles. The results are shown in Table 2.

Preparation Example A7 (Preparation of Water Dispersion 7 of Pigment-Containing Styrene-Acrylic Resin Particles)

One hundred fifty parts of carbon black "MONARCH 717" available from Cabot Corporation were mixed with an aqueous solution of a styrene-acrylic resin "JONCRYL 690" (sodium hydroxide 60%-neutralized product; weight-average molecular weight: 16500; acid value: 240 mgKOH/g) as a polymer dispersant available from BASF AG in an amount of 45 parts in terms of a solid content thereof, and the resulting mixture was subjected to dispersion treatment using zirconia beads, thereby obtaining a water dispersion 7 having a solid content of 19.5%. The results are shown in Table 2.

Preparation Example A8 (Preparation of Water Dispersion 8 of Pigment-Containing Styrene-Acrylic Resin Particles)

The same procedure as in Preparation Example A7 was repeated except that the carbon black used therein was replaced with C.I. Pigment Blue 15:3 "Chromofine Blue (CFB) 6338JC" available from Dainichiseika Color & Chemicals Mfg. Co., Ltd., thereby obtaining a water dispersion 8. The results are shown in Table 2.

TABLE 2

| | Pigment water dispersion | Resin Kind | Acid value (mgKOH/g) | Pigment | Average particle size (nm) |
|---|---|---|---|---|---|
| Preparation Example A1 | Water dispersion 1 | Polyester resin P-1 | 22.4 | Carbon black "MONARCH 717" available from Cabot Corporation | 97 |
| Preparation Example A2 | Water dispersion 2 | Polyester resin P-2 | 31.0 | Carbon black "MONARCH 717" available from Cabot Corporation | 98 |
| Preparation Example A3 | Water dispersion 3 | Polyester resin P-2 | 31.0 | C.I. Pigment Blue 15:3 "CFB6338JC" available from Dainichiseika Color & Chemicals Mfg. Co., Ltd. | 92 |
| Preparation Example A4 | Water dispersion 4 | Polyester resin P-2 | 31.0 | C.I. Pigment Red 150 "FFC 522-1D" available from Fuji Pigment Co., Ltd. | 161 |
| Preparation Example A5 | Water dispersion 5 | Polyester resin P-2 | 31.0 | C.I. Pigment Yellow 155 "IJY4GC" available from Clariant Corporation | 156 |
| Preparation Example A6 | Water dispersion 6 | Polyester resin P-2 | 31.0 | Surface-treated titanium oxide "CR50" available from ISHIHARA SANGYO KAISHA, LTD. | 326 |
| Preparation Example A7 | Water dispersion 7 | Styrene-acrylic resin | 240 | Carbon black "MONARCH 717" available from Cabot Corporation | 101 |
| Preparation Example A8 | Water dispersion 8 | Styrene-acrylic resin | 240 | C.I. Pigment Blue 15:3 "CFB6338JC" available from Dainichiseika Color & Chemicals Mfg. Co., Ltd. | 104 |

Note
*Styrene-acrylic resin: "JONCRYL 690" (acid value: 240 mgKOH/g) available from BASF AG

Preparation Examples B1 to B9 (Preparation of Water-Based Inks 1 to 9)

The respective water dispersions 1 to 8 obtained in Preparation Examples A1 to A8, a commercially available pigment water dispersion, an organic solvent, a surfactant and ion-exchanged water were compounded with each other in the amounts shown in Table 3 (such that a total amount of these components was 100%), thereby obtaining water-based inks 1 to 9. Incidentally, the amount of the pigment water dispersion compounded as shown in Table 3 was a solid content thereof.

TABLE 3

| | | | No. of water-based ink | | | | | | | | |
|---|---|---|---|---|---|---|---|---|---|---|---|
| | | | 1 | 2 | 3 | 4 | 5 | 6 | 7 | 8 | 9 |
| Composition of water-based ink (%) | Pigment water dispersion | Water dispersion 1 (black) | 10 | — | — | — | — | — | — | — | — |
| | | Water dispersion 2 (black) | — | 10 | — | — | — | — | — | — | — |
| | | Water dispersion 3 (cyan) | — | — | 10 | — | — | — | — | — | — |
| | | Water dispersion 4 (magenta) | — | — | — | 10 | — | — | — | — | — |
| | | Water dispersion 5 (yellow) | — | — | — | — | 10 | — | — | — | — |
| | | Water dispersion 6 (white) | — | — | — | — | — | 10 | — | — | — |
| | | Water dispersion 7 (black) | — | — | — | — | — | — | 10 | — | — |
| | | Water dispersion 8 (cyan) | — | — | — | — | — | — | — | 10 | — |
| | | SDP100 (black) | — | — | — | — | — | — | — | — | 5 |
| | Organic solvent: PG | | 30 | 30 | 30 | 30 | 30 | 30 | 30 | 30 | 30 |
| | Organic solvent: BDG | | 5 | 5 | 5 | 5 | 5 | 5 | 5 | 5 | 5 |
| | Surfactant: KF6011 | | 0.5 | 0.5 | 0.5 | 0.5 | 0.5 | 0.5 | 0.5 | 0.5 | 0.5 |
| | Ion-exchanged water | | bal.* | bal.* | bal.* | bal.* | bal.* | bal.* | bal.* | bal.* | bal.* |

Note
bal*: Balance

The details of the pigment water dispersions, the organic solvents and the surfactant shown in Table 3 are as follows.

SDP100: Water dispersion of a self-dispersible carbon black "SENSIJET BLACK SDP100" available from Sensient Technologies Corporation PG: Propylene glycol available from FUJIFILM Wako Pure Chemical Corporation BDG: Diethylene glycol monobutyl ether available from FUJIFILM Wako Pure Chemical Corporation KF6011: Alkylene glycol-modified polydimethylsiloxane "KF-6011" (tradename; nonionic surfactant) available from Shin-Etsu Chemical Co., Ltd.

Preparation Example B10 (Preparation of Water-Based Ink 10)

A cyan dye ink "XKI-N11XLC" commercially available from Cannon Inc., was prepared and used as a water-based ink 10.

Preparation Example C1 (Production of Emulsion of Pigment-Free Polyester Resin P-2)

A four-necked flask equipped with a nitrogen inlet tube, a reflux condenser, a stirrer and a thermocouple was charged with 1700 g of the polyester resin P-2 and 1700 g of methyl ethyl ketone (MEK) to dissolve the polyester resin P-2 in MEK at 60° C., followed by cooling the resulting solution to 25° C.

Next, the thus obtained solution was mixed with 408 g of a 5% sodium hydroxide aqueous solution as a neutralizing agent, and the resulting mixture was further mixed with 5100 g of deionized water under stirring at 25° C., thereby obtaining a dispersion liquid of pigment-free polyester resin particles.

While maintaining the resulting dispersion liquid in the four-necked flask at 60° C. under stirring, an inside pressure of the flask was reduced to remove MEK and water therefrom by distillation.

After being cooled to room temperature, the obtained dispersion was mixed with ion-exchanged water such that a solid content thereof became 30%, and the resulting mixture was subjected to filtration treatment by passing the mixture through a 200-mesh wire mesh screen, thereby obtaining an emulsion of the pigment-free polyester resin P-2.

The average particle size of the thus obtained polyester resin particles was 87 nm.

Preparation Examples D1 to D4 (Preparation of Aqueous Compositions 1 to 4)

The carbodiimide compounds, the emulsion of the polyester resin P-2 obtained in Preparation Example C1, the emulsion of "JONCRYL 690" prepared separately, the organic solvent, the surfactant and ion-exchanged water as shown in Table 4 were compounded with each other in the amounts shown in Table 4 (such that a total amount of these components was 100%), thereby obtaining aqueous compositions 1 to 4.

Incidentally, the amounts of the carbodiimide compounds, the emulsion of the polyester resin P-2 and the emulsion of "JONCRYL 690" compounded as shown in Table 4 were expressed in terms of solid contents of the respective components.

TABLE 4

| | | Preparation Examples | | | |
|---|---|---|---|---|---|
| | | D1 | D2 | D3 | D4 |
| No. of aqueous composition | | 1 | 2 | 3 | 4 |
| Composition (%) | CARBODILITE E-02 | 1 | — | — | 1 |
| | CARBODILITE V-04 | — | 1 | 1 | — |
| | Emulsion of polyester resin P-2 | — | — | 5 | — |
| | Emulsion of JONCRYL 690 | — | — | — | 5 |
| | Organic solvent: PG | 40 | 40 | 30 | 30 |
| | Surfactant: KF6011 | 0.5 | 0.5 | 0.5 | 0.5 |
| | Ion-exchanged water | Balance | Balance | Balance | Balance |

The details of the carbodiimide compounds, etc. shown in Table 4 are as follows.

CARBODILITE E-02: Polycarbodiimide (appearance: emulsion; carbodiimide group equivalent: 445; active ingredient content: 40%; available from Nisshinbo Chemical Inc.; tradename)

CARBODILITE V-04: Polycarbodiimide (appearance: aqueous solution; carbodiimide group equivalent: 335; active ingredient content: 40%; available from Nisshinbo Chemical Inc.; tradename)

Emulsion of JONCRYL 690: Water-based emulsion of "JONCRYL 690" (styrene-acrylic resin; weight-average molecular weight: 16500; acid value: 240 mgKOH/g) available from BASF AG, prepared by neutralizing 60% of an acid value of "JONCRYL 690" with sodium hydroxide (solid content: 20%)

PG: Propylene glycol available from FUJIFILM Wako Pure Chemical Corporation

KF6011: Alkylene glycol-modified polydimethylsiloxane "KF-6011" (tradename; nonionic surfactant) available from Shin-Etsu Chemical Co., Ltd.

Examples 1 to 15 and Comparative Examples 1 to 4 (Printing Using Ink Sets)

Ink sets each constituted of a combination of the aqueous composition shown in Table 4 or 5 and the water-based ink shown in Table 3 were respectively loaded to an ink-jet printer "IPSiO SG2010L" available from Ricoh Co., Ltd., to print a solid image having a size of 10 cm×10 cm on a polyethylene terephthalate (PET) film "LUMIRROR (registered trademark) T60" as a printing medium available from Toray Industries, Inc.

In Examples 1 to 5 and 11 to 15 and Comparative Examples 2 to 4, the two liquids including the aqueous composition and the water-based ink were loaded to the ink-jet printer, and the printing was conducted such that the aqueous composition and the water-based ink were ejected with the same droplet size from two ink-jet print heads of the ink-jet printer, respectively, and then mixed with each other on the printing medium.

In Examples 6 to 10, the aqueous composition and the water-based ink were mixed with each other at a mass ratio of 1:1 to prepare a water-based ink containing the carbodiimide compound, the polyester resin, the pigment and water, and one more water-based ink having the same composition was prepared. The two water-based inks were loaded to the ink-jet printer, and the printing was conducted such that the two water-based inks were ejected with the same droplet size from two ink-jet print heads of the ink-jet printer, respectively.

In Comparative Example 1, two water-based inks having the same composition were prepared, and the printing was conducted in the same manner as in Examples 6 to 10 such that the two water-based inks were ejected with the same droplet size from the two ink-jet print heads of the ink-jet printer, respectively.

After that, the resulting printed material was dried at 60° C. for 10 minutes under ordinary pressures, and subjected to heat treatment at 120° C. for 10 minutes. Then, the printed material was allowed to stand at room temperature for 10 hours for drying, and then evaluated for rub fastness by the following method.

Incidentally, the amount of the aqueous composition applied was from 0.2 to 1.2 g per 1 $m^2$ of the 100%-density solid image in terms of a solid content thereof, and the amount of the ink applied was from 1.0 to 2.0 g per 1 $m^2$ of the 100%-density solid image in terms of a solid content thereof.

[Evaluation of Rub Fastness]

The printed surface of the resulting printed material was rubbed with a cellulose nonwoven fabric "BEMCOT (registered trademark) M3-II" available from Asahi Kasei Fiber K.K., impregnated with 100% ethanol while applying a load of 100 $g/cm^2$ thereto, and the conditions of the printed surface and the nonwoven fabric were visually observed to count the number of the rubbing motions until migration of the color of the ink into the cellulose nonwoven fabric occurred.

If the number of the rubbing motions until migration of the color of the ink on the printed surface into the cellulose nonwoven fabric occurred was not less than 5, the printed material was regarded as being sufficient in rub fastness.

TABLE 5-1

|  | Water-based ink | | Aqueous composition | Printing method | Rub fastness (number of rubbing motions) |
|---|---|---|---|---|---|
|  | Kind of ink | Kind of polymer, etc. | | | |
| Example 1 | Ink 2 (black) | Polyester P-2 (branched) | Composition 1 | *2 | Not less than 30 |
| Example 2 | Ink 3 (cyan) | Polyester P-2 (branched) | Composition 2 | *2 | Not less than 30 |
| Example 3 | Ink 4 (magenta) | Polyester P-2 (branched) | Composition 1 | *2 | Not less than 30 |
| Example 4 | Ink 5 (yellow) | Polyester P-2 (branched) | Composition 2 | *2 | Not less than 30 |
| Example 5 | Ink 6 (white) | Polyester P-2 (branched) | Composition 1 | *2 | Not less than 30 |
| Example 6 | Ink 2 (black) | Polyester P-2 (branched) | Composition 2 | *1 | Not less than 30 |
| Example 7 | Ink 3 (cyan) | Polyester P-2 (branched) | Composition 1 | *1 | Not less than 30 |
| Example 8 | Ink 4 (magenta) | Polyester P-2 (branched) | Composition 2 | *1 | Not less than 30 |
| Example 9 | Ink 5 (yellow) | Polyester P-2 (branched) | Composition 1 | *1 | Not less than 30 |
| Example 10 | Ink 6 (white) | Polyester P-2 (branched) | Composition 2 | *1 | Not less than 30 |
| Example 11 | Ink 1 (black) | Polyester P-1 (linear) | Composition 1 | *2 | 8 |
| Example 12 | Ink 7 (black) | Styrene-acrylic polymer | Composition 3 | *2 | 18 |
| Example 13 | Ink 8 (cyan) | Styrene-acrylic polymer | Composition 3 | *2 | 19 |
| Example 14 | Ink 9 (black) | Self-dispersible pigment | Composition 3 | *2 | 25 |
| Example 15 | Ink 10 (cyan) | Using a dye ink | Composition 3 | *2 | 6 |

Note

*1: The water-based ink and the aqueous composition were previously mixed with each other at a mass ratio of 1:1, and loaded to a printer as one mixed liquid, and then the liquid was ejected from a print head for conducting the printing.

*2: The water-based ink and the aqueous composition were respectively loaded to separate print heads, and ejected therefrom for conducting the printing.

TABLE 5-2

| | Water-based ink | | Aqueous composition | Printing method | Rub fastness (number of rubbing motions) |
|---|---|---|---|---|---|
| | Kind of ink | Kind of polymer, etc. | | | |
| Comparative Example 1 | Ink 1 (black) | Polyester P-1 (Linear) | — | *2 | 4 |
| Comparative Example 2 | Ink 7 (black) | Styrene-acrylic polymer | Composition 1 | *2 | 1 |
| Comparative Example 3 | Ink 8 (cyan) | Styrene-acrylic polymer | Composition 2 | *2 | 1 |
| Comparative Example 4 | Ink 7 (black) | Styrene-acrylic polymer | Composition 4 | *2 | 2 |

Note
*2: The water-based ink and the aqueous composition were respectively loaded to separate print heads, and ejected therefrom for conducting the printing.

Examples 1 to 5 and 11 were concerned with examples of the second embodiment, whereas Examples 6 to 10 and 12 to 15 were concerned with examples of the first embodiment.

From the results shown in Table 5, it was confirmed that according to the aqueous composition, ink set and ink-jet printing method using the carbodiimide compound and the polyester resin, it was possible to obtain a printed material that was excellent in rub fastness. On the other hand, in the Comparative Examples in which the carbodiimide compound or the polyester resin was not used, it was confirmed that no printed material that was excellent in rub fastness could be obtained.

INDUSTRIAL APPLICABILITY

According to the ink set and ink-jet printing method using the aqueous composition of the present invention, it is possible to obtain a printed material that is excellent in rub fastness even when characters or images are printed on a non-water absorbing printing medium or a shrinkable printing medium.

The invention claimed is:

1. An ink-jet printing method comprising the following steps 1 and 2:
   Step 1: ejecting a carbodiimide compound, a polyester resin, a colorant and water onto a surface of a printing medium by an ink-jetting method to print characters or images thereon; and
   Step 2: subjecting the characters or images printed in the step 1 to heat treatment at a temperature of not lower than 50° C. and not higher than 200° C.,
   wherein an acid value of the polyester resin is not less than 5 mgKOH/g and not more than 45 mgKOH/g, the polyester resin comprises a constitutional unit derived from a carboxylic acid component, and the carboxylic acid component comprises an aromatic dicarboxylic acid, an unsaturated aliphatic dicarboxylic acid, and a trivalent or higher-valent polycarboxylic acid.

2. The ink-jet printing method according to claim 1, wherein the content of the unsaturated aliphatic dicarboxylic acid in the carboxylic acid component is not less than 25 mol %.

3. The ink-jet printing method according to claim 1, wherein the polyester resin comprises a constitutional unit derived from an alcohol component, and the alcohol component comprises an aromatic diol.

4. The ink-jet printing method according to claim 1, wherein a weight-average molecular weight of the polyester resin is not less than 5,000 and not more than 100,000.

5. The ink-jet printing method according to claim 1, wherein a glass transition temperature of the polyester resin is not lower than 50° C. and not higher than 90° C.

6. The ink-jet printing method according to claim 1, wherein a mass ratio of the carbodiimide compound to the polyester resin (carbodiimide compound/polyester resin) is not less than 0.01 and not more than 0.5.

7. An aqueous composition for ink-jet printing, comprising a carbodiimide compound, a polyester resin and water, wherein an acid value of the polyester resin is not less than 5 mgKOH/g and not more than 45 mgKOH/g, the polyester resin comprises a constitutional unit derived from a carboxylic acid component, and the carboxylic acid component comprises an aromatic dicarboxylic acid, an unsaturated aliphatic dicarboxylic acid, and a trivalent or higher-valent polycarboxylic acid.

8. The aqueous composition for ink-jet printing according to claim 7, wherein a content of the polyester resin in the aqueous composition is not less than 0.5% by mass and not more than 25% by mass.

9. An ink set for ink-jet printing, comprising the aqueous composition for ink-jet printing according to claim 7, and a water-based ink comprising a colorant.

10. The ink set for ink-jet printing according to claim 9, wherein the water-based ink comprising the colorant has two or more kinds of hues.

11. An ink set for ink-jet printing, comprising an aqueous composition a comprising a carbodiimide compound and water, and an aqueous composition b comprising a polyester resin and water, wherein an acid value of the polyester resin is not less than 5 mgKOH/g and not more than 45 mgKOH/g, the polyester resin comprises a constitutional unit derived from a carboxylic acid component, and the carboxylic acid component comprises an aromatic dicarboxylic acid, an unsaturated aliphatic dicarboxylic acid, and a trivalent or higher-valent polycarboxylic acid.

* * * * *